United States Patent
Chiou et al.

(10) Patent No.: US 9,951,652 B2
(45) Date of Patent: Apr. 24, 2018

(54) AIRCRAFT THRUST REVERSING ASSEMBLY IFS SUPPORT STRUCTURE

(71) Applicant: ROHR, INC., Chula Vista, CA (US)

(72) Inventors: Song Chiou, Cerritos, CA (US); Christian Soria, La Mesa, CA (US)

(73) Assignee: ROHR, INC., Chula Vista, CA (US)

( * ) Notice: Subject to any disclaimer, the term of this patent is extended or adjusted under 35 U.S.C. 154(b) by 749 days.

(21) Appl. No.: 14/097,908

(22) Filed: Dec. 5, 2013

(65) Prior Publication Data
US 2015/0159515 A1    Jun. 11, 2015

(51) Int. Cl.
| | |
|---|---|
| *F02K 1/72* | (2006.01) |
| *F01D 25/24* | (2006.01) |
| *B64D 29/06* | (2006.01) |
| *F02K 1/82* | (2006.01) |
| *F02C 7/20* | (2006.01) |

(52) U.S. Cl.
CPC ............. *F01D 25/24* (2013.01); *B64D 29/06* (2013.01); *F02C 7/20* (2013.01); *F02K 1/72* (2013.01); *F02K 1/822* (2013.01); *F05D 2260/96* (2013.01); *Y02T 50/672* (2013.01); *Y02T 50/675* (2013.01)

(58) Field of Classification Search
CPC ... F02K 1/58; F02K 1/72; F02K 1/822; F02K 1/827; B64D 29/06
See application file for complete search history.

(56) References Cited

U.S. PATENT DOCUMENTS

| | | | | |
|---|---|---|---|---|
| 4,132,068 A | * | 1/1979 | Johnston | F02K 1/805 239/265.39 |
| 5,083,426 A | * | 1/1992 | Layland | F02K 1/78 428/116 |
| 2011/0120143 A1 | | 5/2011 | Soulier et al. | |
| 2012/0181359 A1 | * | 7/2012 | Welch | B64D 29/00 239/589 |
| 2012/0291416 A1 | * | 11/2012 | Chiou | F02K 1/60 60/226.2 |
| 2012/0318380 A1 | | 12/2012 | Mer et al. | |

OTHER PUBLICATIONS

Extended European Search Report dated Apr. 20, 2015 in European Application No. 14194108.8.

* cited by examiner

*Primary Examiner* — Justin Seabe
(74) *Attorney, Agent, or Firm* — Snell & Wilmer L.L.P.

(57) ABSTRACT

A nacelle is disclosed. The nacelle may include an inner fixed structure ("IFS") comprising a first half, the first half comprising a central barrel portion, wherein the first half includes a first member that extends radially outward from the central barrel portion and a second member that extends radially outward from the central barrel portion radially opposite the first member, a first support structure overlaid by a first composite material that extends axially along a confluence between the central barrel portion and the first member, the first support structure configured to contact a second half comprising a second central barrel portion, and a second support structure overlaid by a second composite material that extends axially along the confluence between the central barrel and the second member, the second support structure configured to contact the second half.

16 Claims, 6 Drawing Sheets

AIRCRAFT THRUST REVERSING ASSEMBLY IFS SUPPORT STRUCTURE

FIELD

The present disclosure relates to a nacelle system for a jet aircraft propulsion system, and more particularly, to a bumper of a nacelle inner fixed structure ("IFS").

BACKGROUND

Jet aircraft propulsion systems (such as those that power modern commercial aircraft) typically include an annular bypass air duct situated substantially concentrically about an engine core. The bypass air duct may be defined by an aerodynamically shaped outer barrel situated substantially concentrically about an aerodynamically shaped IFS. Thus, the IFS may be generally situated about the engine core, which may comprise a variety of components, including a combustion chamber that burns a hydrocarbon fuel in the presence of oxygen to produce heated exhaust gas. The engine core may generate substantial thermal energy, against which the IFS may require insulation. The IFS may be coupled to the outer barrel by a first radially extending member ("first member or bifurcation") and a second radially extending member ("second member or bifurcation"). The IFS is typically formed by two substantially mirror image facing halves which close together to surround and generally enclose the engine core. The IFS experiences differential pressure depending on the operating conditions. In normal operating conditions, the pressure in the bypass duct is greater than the pressure around the engine core, so the IFS halves are pushed together and pressure is directed radially inward. Provision must be made for these radially inwardly directed forces to be reacted in this condition without resulting in any significant deflection of the IFS. In certain other scenarios, the pressure around the engine core may exceed the pressure in the bypass duct, in which case the two IFS halves are pulled apart and pressure is directed radially outward.

SUMMARY

A nacelle may include an inner fixed structure ("IFS") comprising a first half, the first half comprising a central barrel portion, wherein the first half includes a first member that extends radially outward from the central barrel portion and a second member that extends radially outward from the central barrel portion radially opposite the first member, a first support structure overlaid by a first composite material that extends axially along a confluence between the central barrel portion and the first member, the first support structure configured to contact a second half comprising a second central barrel portion, and a second support structure overlaid by a second composite material that extends axially along the confluence between the central barrel and the second member, the second support structure configured to contact the second half. The first support structure and the second support structure may be configured to suppress noise. The nacelle may further comprise a thermally insulating material surrounding an inner surface of the IFS. The first support structure may be continuous along an axial length of the IFS. The second support structure may be continuous along an axial length of the IFS. The first support structure and the second support structure may be overlaid by a composite material. The IFS may comprise a composite material that extends circumferentially about an inner surface thereof, including over the first support structure and the second support structure.

A nacelle may also include an IFS comprising a first substantially annular half comprising a first central barrel portion and a second substantially annular half comprising a second central barrel portion, the first substantially annular half including a first member that extends radially outward from the first central barrel portion and a second member that extends radially outward from the second central barrel portion radially opposite the first member. The nacelle may also comprise a first support structure overlaid by a composite material that extends axially along the confluence between the first central barrel portion and the first member, a second support structure overlaid a composite material that extends axially along the confluence between the first central barrel portion and the second member, the second substantially annular half including a third member that extends radially outward from the second central barrel portion and a fourth member that extends radially outward from the second central barrel portion radially opposite the third member, a third support structure overlaid by a composite material that extends axially along the confluence between the second central barrel portion and the third member, and a fourth support structure overlaid a composite material that extends axially along the confluence between the second central barrel portion and the fourth member. The first support structure, the second support structure, the third support structure, and the fourth support structure may be configured to suppress noise. The first support structure and the second support structure may be continuous along an axial length of the IFS. The third support structure and fourth support structure may be continuous along an axial length of the IFS. The first support structure, the second support structure, the third support structure, and/or the fourth support structure may be overlaid by a composite material. The IFS may comprise a composite material that extends circumferentially about an inner surface thereof, including over the first support structure and the second support structure. The IFS may comprise a composite material that extends circumferentially about an inner surface thereof, including over the third support structure and the fourth support structure.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the engine. As used herein, "forward" refers to the direction associated with the nose (e.g., the front end) of an aircraft, or generally, to the direction of flight.

The nacelle may extend along the axis defined by the line marked A-A'. The portion near A may be referred to as forward and the portion near A' may be referred to as aft. In that regard, A is forward of A' and A' is aft of A.

Figure 1A:
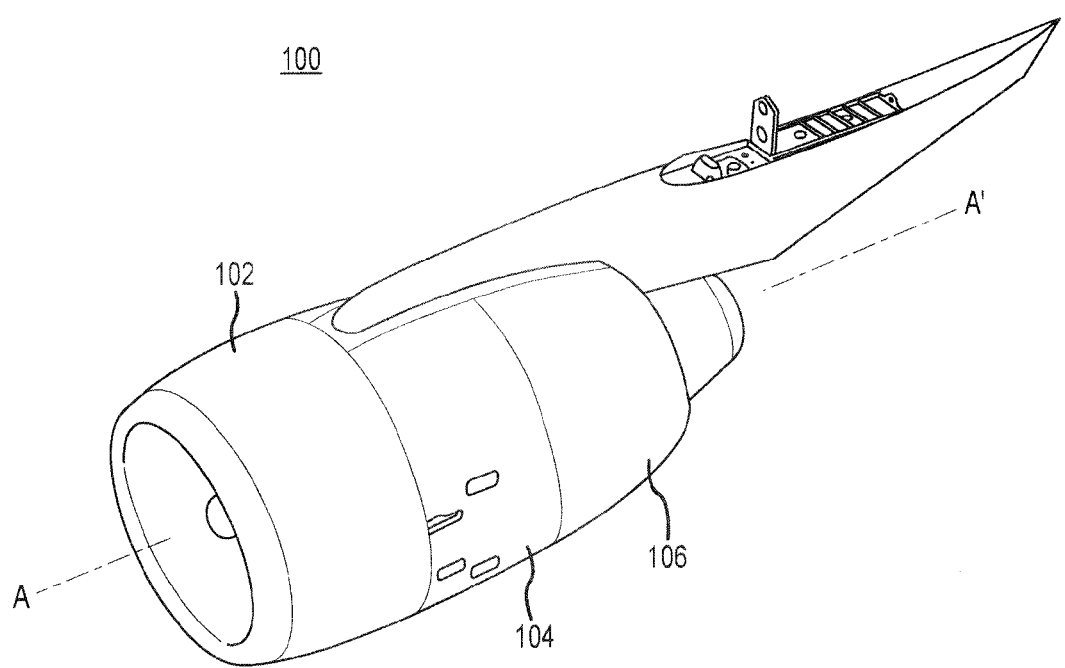
FIG. 1A illustrates a perspective view of a nacelle of a jet aircraft propulsion system.

With brief reference to FIG. 1A, a conventional nacelle 100 of jet aircraft propulsion system is shown. The nacelle 100 may comprise an inlet portion 102, a fan cowl portion 104, and a thrust reversing assembly 106. Each of these nacelle 100 portions and assemblies may comprise an aerodynamically shaped outer surface and house a variety of propulsion system components.

Figure 1B:
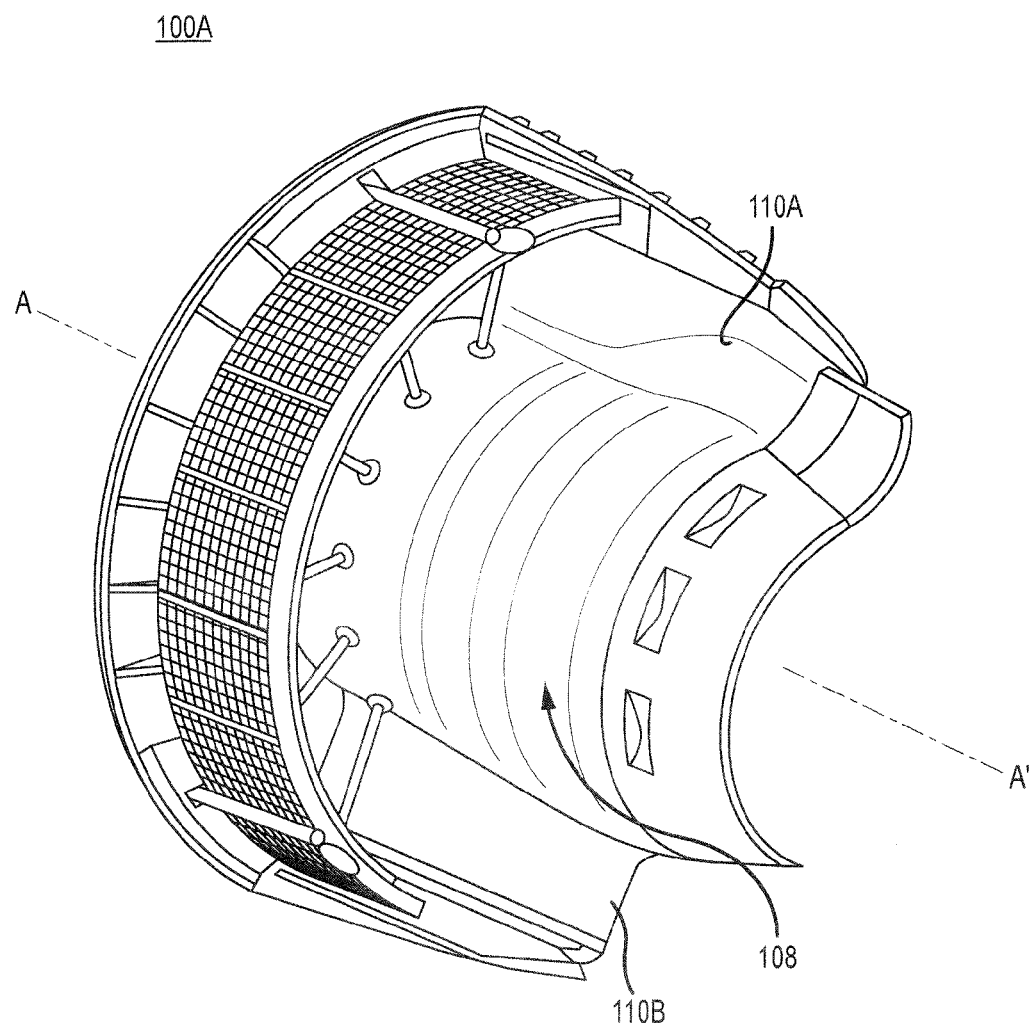
FIG. 1B illustrates a perspective view of an IFS coupled to an outer barrel of a thrust reversing assembly.

For example, as shown with additional reference to FIG. 1B, a conventional thrust reversing assembly 106 may comprise two substantially annular halves (e.g., a first half such as 100A and a second half (not shown)), and each half may, together with additional components such as translating sleeves, form the thrust reversing assembly 106. The first half 100A of a thrust reversing assembly 106 is shown in FIG. 1B. A second half (not shown) of the thrust reversing assembly 106 may comprise a mirror image of the first half 100A.

The thrust reversing assembly 106 may further comprise a first half 108 of an IFS (or first IFS half 108) and a second half (not shown) of the IFS. The first half 108 may comprise a first central barrel portion and a first member (e.g., a substantially planar member such as a bifurcation panel) 110A that extends radially outward from the first central barrel portion of the first half of the IFS 108. The first half 108 may further comprise a second member (e.g., a substantially planar member such as a bifurcation panel) 110B that extends radially outward from the first central barrel portion of the first half of the IFS 108. The first IFS half 108 may correspond to a second IFS half (not shown), which may comprise a mirror image of the first IFS half 108. When the two IFS halves are placed together, the two central barrel portions form a substantially annular enclosure around the engine. The second IFS half may include a third radially extending member and a fourth radially extending member (not shown), as described above with reference to the first IFS half 108.

Bumpers may be coupled (e.g., welded, riveted, forged or cast together with, etc.) to the inner surface of a conventional IFS half (e.g., first IFS half 108). When two IFS halves are closed around the engine, the bumpers on each respective half abut one another and create a load path. Differential pressure on each side of an IFS half (for instance higher pressure in the bypass duct versus the pressure inside the annular space around the engine) creates loads. Each bumper may react these pressure loads applied across the IFS half by the air flow in the bypass duct. These pressure loads may cause the IFS half (and/or the assembled IFS) to deflect inward towards the engine core (e.g., radially inward toward the axis A-A'). The bumpers on each IFS half may, in response to these pressure loads, bump or press against each other to provide a continuous hoop load path between both the halves of the IFS.

As described above, the IFS houses an engine core. The engine core burns a hydrocarbon fuel in the presence of oxygen to generate exhaust gasses. These gasses may exceed temperatures of 1000 degrees Fahrenheit (~537 degrees Celsius), and the IFS must insulate the radially outer portions of the thrust reversing assembly 106 from these temperatures. The IFS may, in addition, protect against any engine compartment fires expanding to the surrounding nacelle thrust reversing assembly 106 structure.

Typically, the inner surface of the IFS is wrapped in an insulating material, often referred to as a "fire blanket." Where the radially inner surface of the IFS comprises a plurality of distinct bumpers, however, each bumper must be individually wrapped in the fire blanket, leading to inconsistencies and potential gaps in the spaces between the fire blanket and the inner surface of the IFS. Thus, during operation, a bumper may experience a significant increase in temperature and stress, due, for example, to a leak or gap in the fire blanket. Conventional bumpers may thus overheat the material of the IFS skin or panel to which they are coupled, which may damage the IFS.

Figure 2A:
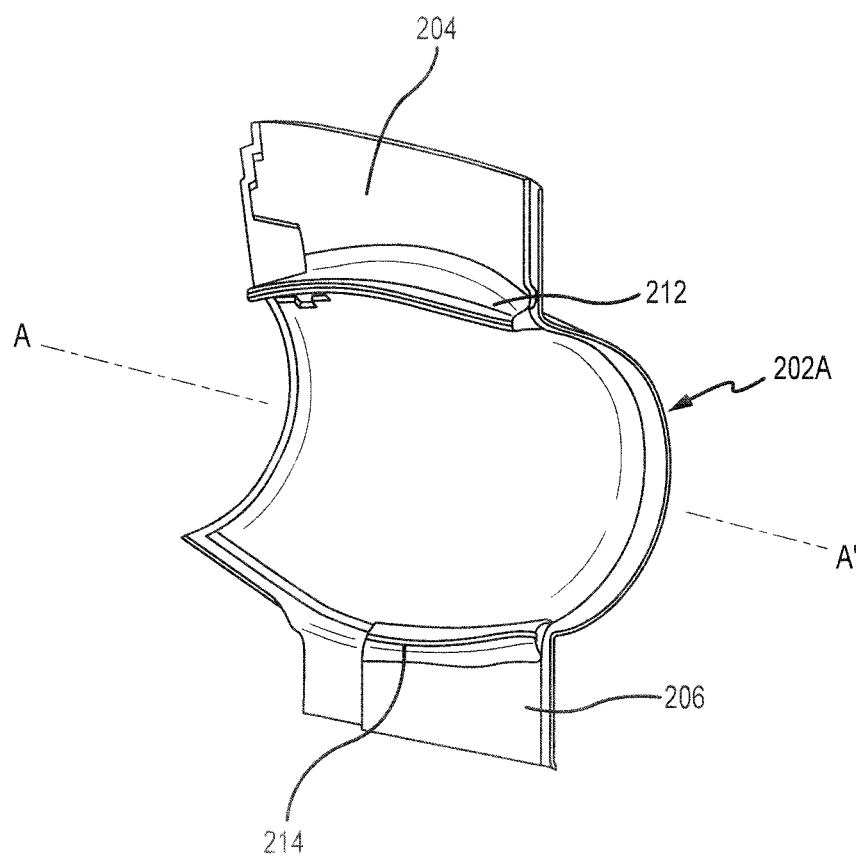
FIG. 2A illustrates, in accordance with various embodiments, a perspective view of a half of an IFS.

Therefore, in accordance with the present disclosure and with reference to FIG. 2A, a first substantially annular half 202A of an IFS is shown. The first half 202A may extend axially along the axis marked A-A'. The first half 202A may comprise a radially inner surface or "back skin" as well as a radially outer surface or "face skin." The back skin may be situated about an interior surface of the first half 202A, while the face skin may be situated about an exterior surface of the first half 202A.

Either or both of the face skin and/or back skin may comprise any suitable material, including, for example, a tape or sheet composite material, etc. The face skin and/or the back skin may further comprise plied or layered structures. The face skin may be separated from the back skin by a radial space, which may be occupied by a variety of materials, including, for example, a noise suppressing material or structure. This space, including any material comprising or filling the space, may be referred to herein as "core material."

The first half 202A may include a first member 204 that extends radially outward from the central barrel portion of first half 202A of the IFS. The first half 202A may further include a second member 206 that extends radially outward from the central barrel portion of the first half 202A of the IFS. The first member 204 and/or the second member 206 may comprise any of a variety of suitable geometries, such as substantially planar geometries, geometries that have one or more curves, and the like.

The first half 202A may include a first support structure 212 (or first "bumper") and/or a second support structure 214 (or second "bumper"). The first support structure 212 and/or the second support structure 214 may comprise any of a variety of suitable loadbearing materials, including, for example, one or more noise suppressing structures. The first support structure 212 may be overlaid by a material, such as a back skin, that extends axially along the confluence between the first half 202A and the first member 204. Likewise, the second support structure 214 may be overlaid by a material, such as a back skin, that extends axially along the confluence between the first half 202A and the second member 206. In various embodiments, the back skin may extend radially about the inner surface of the first IFS half 202A.

Thus, the first support structure 212 and/or the second support structure 214 may extend continuously and/or substantially continuously along the confluence between the central barrel portion and the first member 204 and/or second member 206, respectively. In particular, although many conventional systems may include a plurality of bumpers separated by a an axial space or distance, as described herein, the first and second support structures 212 and 214 may extend continuously and/or substantially continuously (e.g., greater than 50% of the axial length of the first and/or second support structure 212 and/or 214) along the axial length of the central barrel portion.

In addition, as described above, many conventional bumpers may comprise metallic structures which may be mechanically coupled (e.g., bolted or riveted) to an IFS. In contrast, the first support structure 212 and/or the second support structure 214 may comprise non-metallic (e.g., composite) structures, and may, in various embodiments, be overlaid by the composite surface comprising the back skin of the IFS.

Figure 2B:
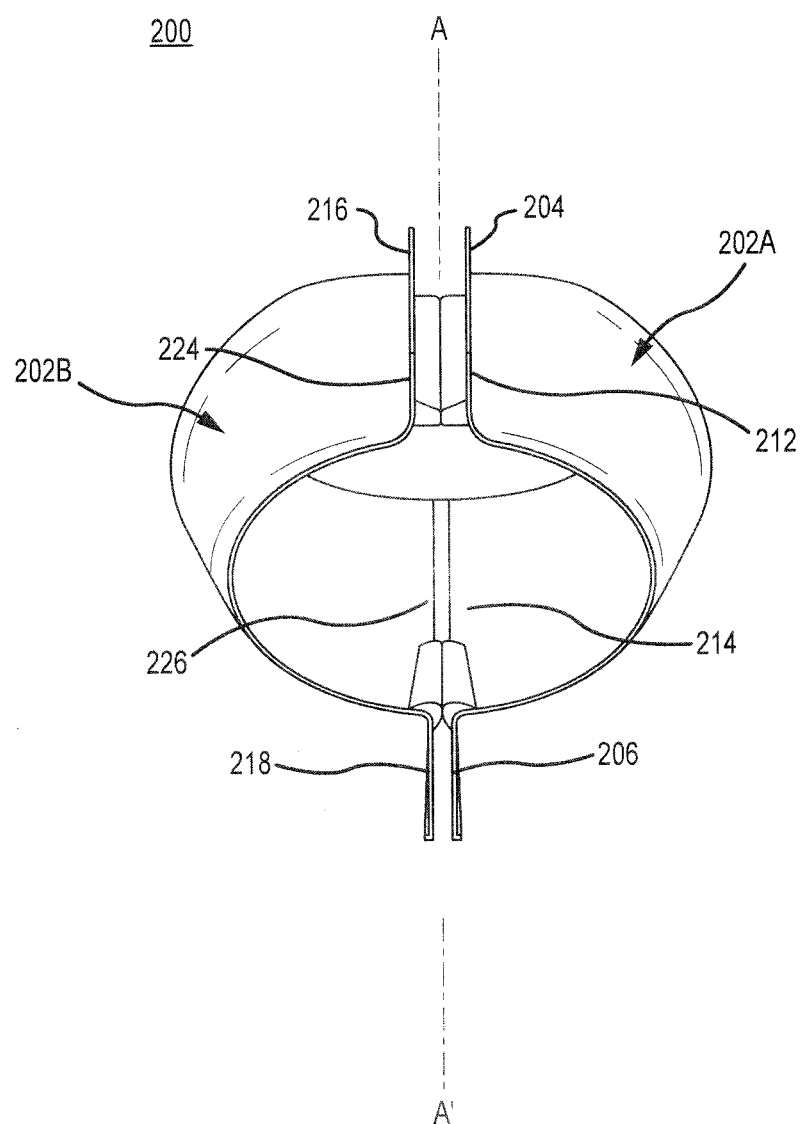
FIG. 2B illustrates, in accordance with various embodiments, a perspective view of an IFS.

As shown with reference to FIG. 2B, an IFS 200 comprises the first substantially annular half 202A and a second substantially annular half 202B. The second half 202B may comprise a structure identical to and/or substantially similar to the first half 202A of the IFS 200, except that the second half 202B may comprise the mirror image of the first half 202A such that each half 202A and 202B may fit together to form an annular IFS 200.

Thus, the second half 202B may extend axially along the axis marked A-A'. The second half 202B may comprise a third radially inner surface or back skin as well as a fourth radially outer surface or face skin. As described above either or both of the face skin and/or back skin may comprise any suitable material, including, for example, a tape, a metallic or composite (e.g., woven composite) material, etc. The face skin and/or the back skin may further comprise plied or layered structures. The face skin may be separated from the back skin by a radial space, which may be occupied by a variety of materials, including, for example, a noise suppressing material or structure. This space, including any material comprising or filling the space, may be referred to herein as "core material."

The second half 202B may include a third member 216 that extends radially outward from the central barrel portion of the second half 202B of the IFS 200. The second half 202B may further include a fourth member 218 that extends radially outward from the central barrel portion of the second half 202B of the IFS 200. The third member 216 and/or the fourth member 218 may comprise any of a variety of suitable geometries, such as substantially planar geometries, geometries have one or more curves, and the like.

The second half 202B may include a third support structure 224 (or third "bumper") and/or a fourth support structure 226 (or fourth "bumper"). The third support structure 224 and/or the fourth support structure 226 may comprise any of a variety of suitable loadbearing materials, including, for example, one or more noise suppressing structures. The third support structure 224 may be overlaid by a material, such as the back skin, that extends axially along the confluence between the second half 202B and the third member 216. Likewise, the fourth support structure 226 may be overlaid by a material, such as the back skin, that extends axially along the confluence between the second half 202B and the fourth member 218.

Thus, the third support structure 224 and/or the fourth support structure 226 may extend continuously and/or substantially continuously along the confluence between the central barrel portion of the second half 202B and the third member 216 and/or fourth member 218, respectively. In particular, although many conventional systems may include a plurality of bumpers separated by a an axial space or distance, as described herein, the third and fourth support structures 224 and 226 may extend continuously and/or substantially continuously (e.g., greater than 50% of the axial length of the third and/or fourth support structure 224 and/or 226) along the axial length of the central barrel portion of the second half 202B.

In addition, as described above, many conventional bumpers may comprise metallic structures which may be mechanically coupled (e.g., bolted or riveted) to an IFS half. In contrast, the third support structure 224 and/or the fourth support structure 226 may comprise metallic and/or non-metallic (e.g., composite, woven composite) structures, and may, in various embodiments, be overlaid by the metallic and/or composite surface comprising the face skin of the IFS.

A first half 202A may, in operation, abut a second half 202B. More particularly, the first support structure 212 may abut (or bump or press up against) the third support structure 224. Rather than discrete loading points created by prior art bumpers, the loading path created between first support structure 212 and third support structures 224 is distributed along a line. Similarly, the second support structure 214 may abut (or bump or press up against) the fourth support structure 226. The first half 202A and second half 202B may, as described above, be held together by a force exerted against each IFS half 202A and 202B. Thus, the first half 202A and the second half 202B may, together, form a substantially annular IFS 200 configured to house an engine core.

Figure 3:
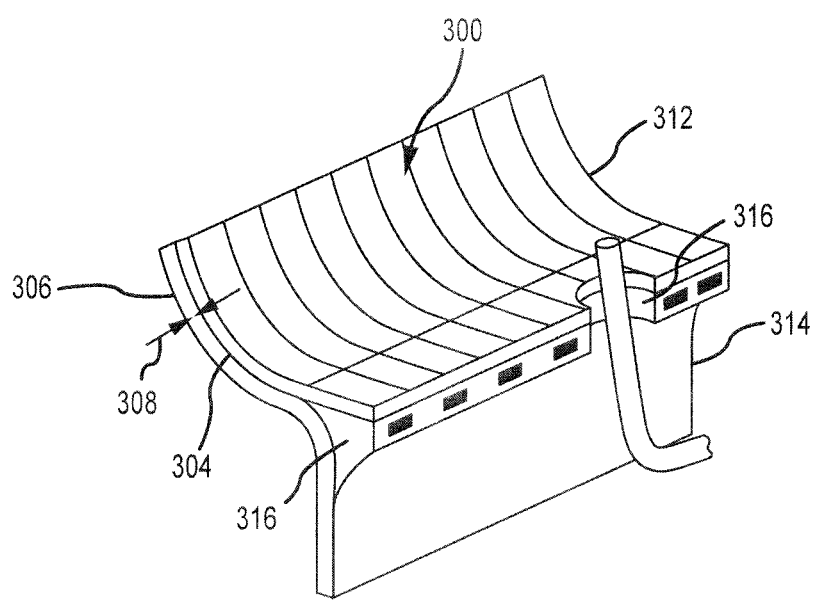
FIG. 3 illustrates, in accordance with various embodiments, a cross-sectional perspective view of an IFS half coupled to a member extending radially therefrom.

As described above, an insulating material may be placed around the internal surface (i.e., the back skin) of the IFS 200. Such a material may be referred to as a "fire blanket" (see, e.g., FIG. 3). This blanket may be affixed to the internal surface of the IFS 200 and may insulate the portion of the nacelle external to the IFS 200 against the thermal energy generated by the engine during operation.

A variety of supporting structure (i.e., bumper) shapes and constructions may, in various embodiments, form each half 202A and/or 202B of the IFS 200. For example, with reference to FIG. 3, a cross-sectional profile view of an IFS 302 is shown. The IFS 302 may, as described above, comprise an inner radial surface or back skin 304 separated by a radial distance 308 from an outer radial surface or face skin 306. The separation between the back skin 304 and face skin 306 may be filled with any of a variety of suitable materials and/or structures, such as reinforcing or supporting materials (e.g., foamlike materials) and/or noise suppressing structures. The separation 308 may be further referred to, as described above, as an IFS core. A thermally insulating structure and/or material, such as a fire blanket 300, may be concentrically situated about the back skin 304 and/or coupled to the back skin 304.

A supporting structure 316 may be coupled between the confluence of the annular half 312 and the planar member 314, as described above. The supporting structure 316 may overlay the face skin 306 and be overlaid by the back skin 304. Thus, the supporting structure 316 may be bonded to the IFS 302 under the back skin 304. The supporting structure 316 may also be continuous (or substantially continuous) along an axial length of the annular half 312. The supporting structure 316 may, however, and in various embodiments, as shown, be perforated by one or more structural ports 318, through which a variety of engine and/or nacelle components (e.g., mechanical, hydraulic, electrical, and the like components) may pass. In addition, as shown, the fire blanket 300 may extend out to cover and protect the supporting structure 316.

Figure 4:
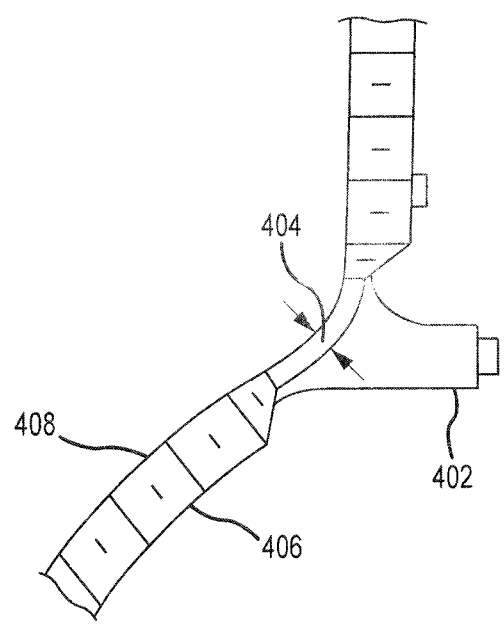
FIG. 4 illustrates, in accordance with various embodiments, a cross-sectional view of an IFS support structure coupled to a tapered portion of an IFS.

With reference to FIG. 4, incorporation of a supporting structure 402 may permit a reduction, in the vicinity of the supporting structure 402, in the separation 404 between a back skin 406 and a face skin 408. In particular, the separation 404 may be reduced (and/or core material eliminated or reduced), because the supporting structure 402 may sufficiently reinforce the IFS shell.

Therefore, as to each of the figures described above, a variety of advantages may arise. For instance, a continuous and/or substantially continuous supporting structure may reduce a volume and/or area through which heat produced by the engine (e.g., fire in the event of engine failure) may spread. Specifically, in contrast to a plurality of non-continuous or segmented conventional bumpers, as described herein, heat may be prevented from spreading beyond and/or through the depressions or spaces between bumper segments. Thus, for example, fire may spread (in a typical IFS) from the space around the engine to the space between the bifurcation panels. Because of the continuous bumper sealing against fire spread, as described herein, the fire zone around the engine may be reduced in volume and no longer include the space between the bifurcation panels." In addition, the continuous (and/or, again, substantially continuous) supporting structures described herein may more evenly distribute structural stresses. Thus, the supporting structures described herein may strengthen the IFS, particularly in contrast to more conventional IFS systems.

Further still, the layered bonding methods described above may add additional strength and/or heat tolerance to the systems and structures described herein, particularly as heat and pressure loads may be more evenly distributed over the axial length of these supporting structures, rather than localized at a small plurality of independent, non-continuous or discrete and/or metallic (conducting) bumpers.

The connecting lines shown in the various figures contained herein are intended to represent exemplary functional relationships and/or physical couplings between the various elements. It should be noted that many alternative or additional functional relationships or physical connections may be present in a practical system.

The described benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more."

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:
1. A nacelle comprising:
a first half of an inner fixed structure ("IFS") comprising a central barrel portion, a first member extending radially outward from the central barrel portion and a second member extending radially outward from the central barrel portion in a direction radially opposite the first member;
a first bumper extending axially along a first confluence joining the central barrel portion and the first member, the first bumper being substantially continuous along an axial length of the IFS and configured to abut a third bumper in a second half of the IFS; and
a second bumper extending axially along a second confluence joining the central barrel and the second member, the second bumper configured to abut a fourth bumper in the second half of the IFS,
wherein the central barrel portion, the first member, and the second member comprise a face skin, a first composite skin, and a core located between the face skin and the first composite skin, the core comprising a core material throughout the central barrel portion, the first member and the second member,
wherein a first radial distance is defined between the face skin and the first composite skin throughout the central barrel portion,
wherein a second radial distance is defined between the face skin and the first composite skin throughout the first confluence, and wherein the second radial distance is less than the first radial distance and the core material within the second radial distance is less than the core material within the first radial distance.

2. The nacelle of claim 1, wherein the first bumper and the second bumper are configured to suppress noise.

3. The nacelle of claim 1, further comprising a thermally insulating material surrounding an inner surface of the IFS.

4. The nacelle of claim 1, wherein the first bumper is continuous along the axial length of the IFS.

5. The nacelle of claim 4, wherein the second bumper is continuous along the axial length of the IFS.

6. The nacelle of claim 5, wherein the first bumper and the second bumper are overlaid by the first composite skin.

7. The nacelle of claim 6, wherein the first composite skin extends circumferentially about an inner surface of the IFS, including over the first bumper and the second bumper.

8. A nacelle comprising:
an inner fixed structure ("IFS") comprising a first substantially annular half, the first substantially annular half comprising a first central barrel portion and a second substantially annular half, the second substantially annular half comprising a second central barrel portion, the first substantially annular half including a first member that extends radially outward from the first central barrel portion and a second member that extends radially outward from the first central barrel portion radially opposite the first member,
wherein the first central barrel portion, the first member, and the second member comprise a face skin, a first composite skin, and a core located between the face skin and the first composite skin, wherein the first central barrel portion comprises a first radial distance between the face skin and the first composite skin;
a first bumper extending axially along a first confluence between the first central barrel portion and the first member, wherein the first bumper is substantially continuous along an axial length of the IFS, wherein the first substantially annular half comprises a second radial distance between the face skin and the first composite skin at the first confluence between the first central barrel portion and the first member, wherein the second radial distance is less than the first radial distance;
a second bumper extending axially along a second confluence between the first central barrel portion and the second member;
the second substantially annular half including a third member that extends radially outward from the second central barrel portion and a fourth member that extends radially outward from the second central barrel portion radially opposite the third member;
a third bumper extending axially along a third confluence between the second central barrel portion and the third member; and
a fourth bumper extending axially along a fourth confluence between the second central barrel portion and the fourth member,
wherein the core comprises a core material throughout the first central barrel portion, the first member and the second member and
wherein the core material within the second radial distance is less than the core material within the first radial distance.

9. The nacelle of claim 8, wherein the first bumper, the second bumper, the third bumper, and the fourth bumper are configured to suppress noise.

10. The nacelle of claim 9, further comprising a thermally insulating material surrounding an inner surface of the IFS.

11. The nacelle of claim 9, wherein the first bumper and the second bumper are continuous along the axial length of the IFS.

12. The nacelle of claim 9, wherein the third bumper and the fourth bumper are continuous along the axial length of the IFS.

13. The nacelle of claim 9, wherein the third bumper and the fourth bumper are overlaid by a second composite skin.

14. The nacelle of claim 9, wherein the first composite skin extends circumferentially about an inner surface of the IFS, including over the first bumper and the second bumper.

15. The nacelle of claim 9, wherein a second composite skin extends circumferentially about an inner surface of the IFS, including over the third bumper and the fourth bumper.

16. A nacelle comprising:
an inner fixed structure ("IFS") comprising a first half, the first half comprising a central barrel portion, wherein the first half includes a first member that extends radially outward from the central barrel portion and a second member that extends radially outward from the central barrel portion radially opposite the first member,
wherein the central barrel portion, the first member, and the second member comprise a face skin, a composite back skin, and a core located between the face skin and the composite back skin, wherein the central barrel portion comprises a first radial distance between the face skin and the composite back skin;
a first bumper extending axially along a confluence between the central barrel portion and the first member, the first bumper configured to contact a second half of the IFS comprising a second central barrel portion, wherein the first bumper is substantially continuous along an axial length of the IFS, wherein the first half comprises a second radial distance between the face skin and the first composite skin at the confluence between the central barrel portion and the first member, wherein the second radial distance is less than the first radial distance; and
a second bumper extending axially along the confluence between the central barrel and the second member, the second bumper configured to contact the second half of the IFS,
wherein the core comprises a core material throughout the central barrel portion, the first member and the second member and
wherein the core material within the second radial distance is less than the core material within the first radial distance.

* * * * *